United States Patent [19]

Wheaton

[11] 3,950,563

[45] Apr. 13, 1976

[54] METHOD FOR MAKING A BUN

[76] Inventor: Donald S. Wheaton, Columbus, Ohio

[22] Filed: Mar. 11, 1974

[21] Appl. No.: 449,911

Related U.S. Application Data

[62] Division of Ser. No. 279,684, Aug. 10, 1972, Pat. No. 3,831,507.

[52] U.S. Cl. .................................. 426/505; 426/138
[51] Int. Cl.² ............................................ A21D 8/06
[58] Field of Search ........... 426/138, 139, 496, 512, 426/514, 505

[56] References Cited

UNITED STATES PATENTS

| | | | |
|---|---|---|---|
| 1,794,238 | 2/1931 | McKibben | 426/139 |
| 1,815,527 | 7/1931 | Scruggs | 426/138 |
| 1,854,224 | 4/1932 | Rankin | 426/138 |
| 2,492,832 | 12/1949 | Barasch | 426/139 |
| 3,385,205 | 5/1968 | McCloud | 426/138 UX |
| 3,410,691 | 11/1968 | Stanley | 426/138 X |

*Primary Examiner*—Raymond N. Jones
*Attorney, Agent, or Firm*—Cennamo, Kremblas, & Foster

[57] ABSTRACT

A baking pan assembly and a method of using same to make a sandwich bun having separate upper and lower portions. The assembly and method is characterized by an arrangement of three baking pans in vertical substantially sealed relationship. The middle pan in this assembly has a unique shape which not only forms a bowl-like recess in the lower portion of the bun but contributes in the baking process to permit the lower surface of the top portion of the bun and the interior surface defining the recess in the lower portion of the bun to be fully baked in a soft, unbrowned condition.

2 Claims, 11 Drawing Figures

METHOD FOR MAKING A BUN

This application is a division of my co-pending application Ser. No. 279,684 filed on Aug. 10, 1972, now U.S. Pat. No. 3,831,507.

BACKGROUND

The present invention relates generally to sandwich buns and particularly to a novel sandwich bun and the apparatus and method of making the same.

Conventional sandwich buns or buns in general are baked in much the same manner employing generally one baking pan but never more than two in conjunction with one another to the knowledge of the present inventor.

For example, the well-known hamburger or hotdog bun is baked as an integral unit and sliced after baking to permit the food product to be disposed between the upper and lower portions. It is generally considered desirable that the interior surfaces of these buns have a soft, white or unbrowned texture. This is still true even though some persons desire to toast these surfaces immediately prior to eating since the unbrowned texture has a different flavor upon toasting than the browned outer texture.

One disadvantage to the conventional sandwich bun is that they are adapted for convenient use with only generally flat food products, for example hamburger, luncheon meats and the like. Of course, weiner buns are convenient only for the conventional weiner or link type product. Food products which have a different shape or have no well-defined and consistent shape such as pork or beef barbecue mixtures are difficult to handle in a convenient manner.

Further, until the present invention, no sandwich bun has been devised which has a construction which conveniently provides a vehicle in which the last mentioned food products can be handled and which also offers such a convenient shape with the inner surfaces having the desirable characteristic unbrowned texture of the conventional bun.

SUMMARY OF INVENTION

The present invention comprises a novel method of baking and a baking pan assembly for a sandwich bun which possesses a unique shape and a highly desirable, palatable texture.

The baking pan assembly in the preferred embodiment consists of three separate pans. The pans are disposed, when ready to place in an oven, in vertically spaced relationship atop one another. The top and bottom pans are of generally conventional construction, but the middle pan is provided with a plurality of novel bowl-like recesses, which define downwardly-extending protrusions.

It has been discovered that this arrangement and construction of pans results in a lower portion with a generally bowl-like cavity corresponding to any predetermined shape of the protrusion. However it also provides a bun wherein the interior surfaces of both the upper and lower portions, which are to be exposed to the food product, possess the desirable unbrowned texture after baking. The remaining outer surfaces of the bun possess the characteristics brown texture of conventional buns.

OBJECTS

It is a primary object of the present invention to provide a novel baking pan assembly and method for baking a novel sandwich bun which is much more convenient for use with food products not having the conventional generally flat shape.

It is another object of the present invention to provide a baking pan assembly and method for making a two-piece sandwich bun which has a novel configuration characterized by a generally bowl-shaped cavity or recess in the lower portion adapted to contain all or a substantial portion of the food product to be used therewith.

It is another object of the present invention to provide a baking pan assembly and method of the type described wherein the novel configuration produced also possesses interior confronting surfaces of the separate bun portions which are fully baked and yet maintain an unbrowned texture.

It is still another object of the present invention to provide a pan assembly and method of the type described wherein the unique two-piece construction may be accomplished in a one-step, economically practical, baking operation with both the upper and lower portions being simultaneous baked.

DETAILED DESCRIPTION

Figure 1:
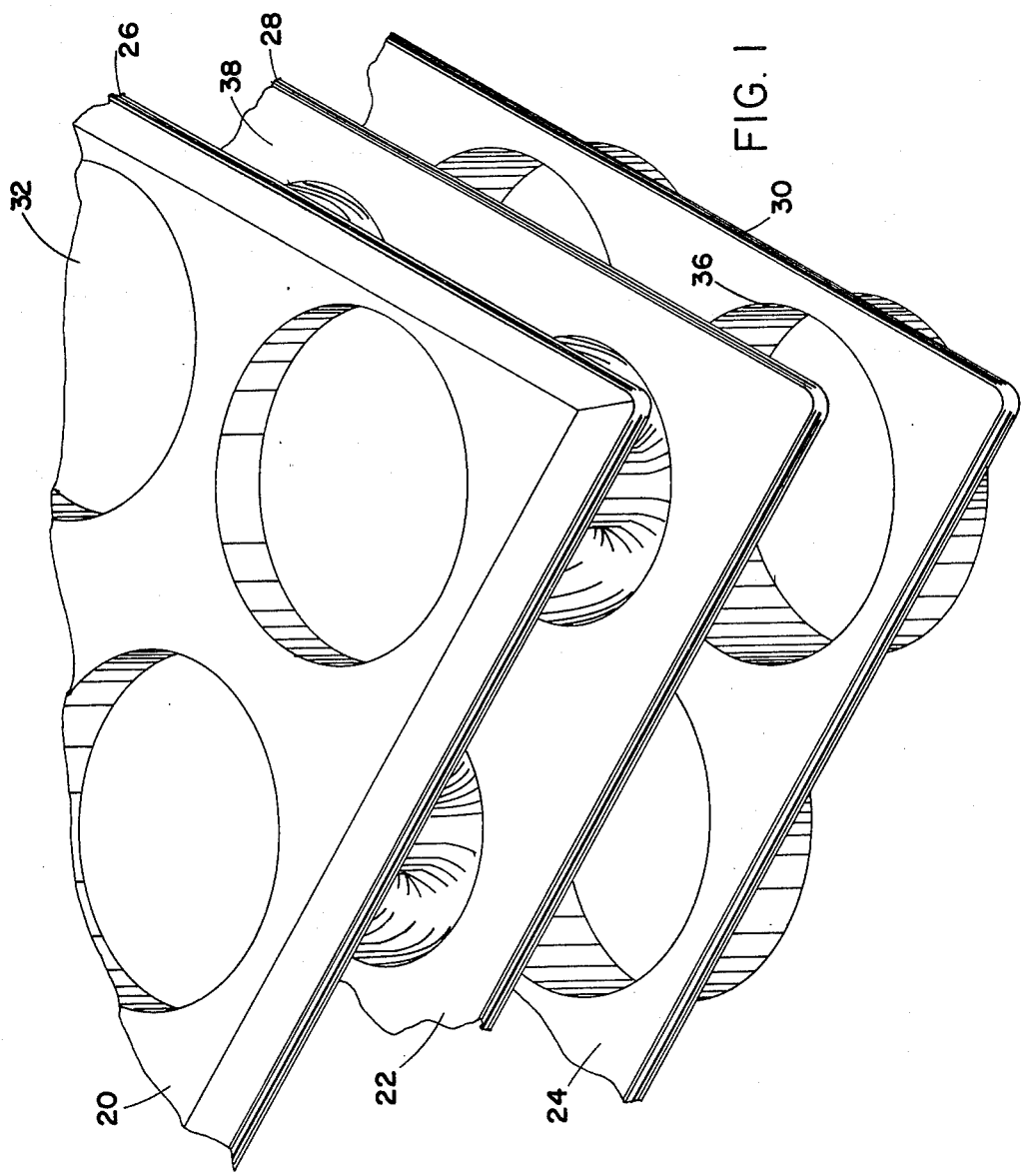
FIG. 1 is a perspective view of a baking pan assembly shown in vertically disposed exploded relationship to one another and constructed in accordance with the present invention.
Figure 2:
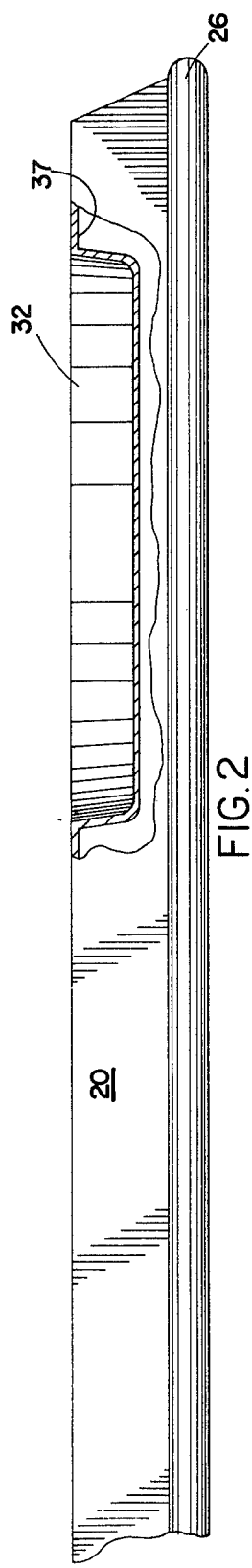
FIG. 2 is a partial side elevational view, partially in section taken through the centerline of a recess of the uppermost pan as shown in FIG. 1.
Figure 3:
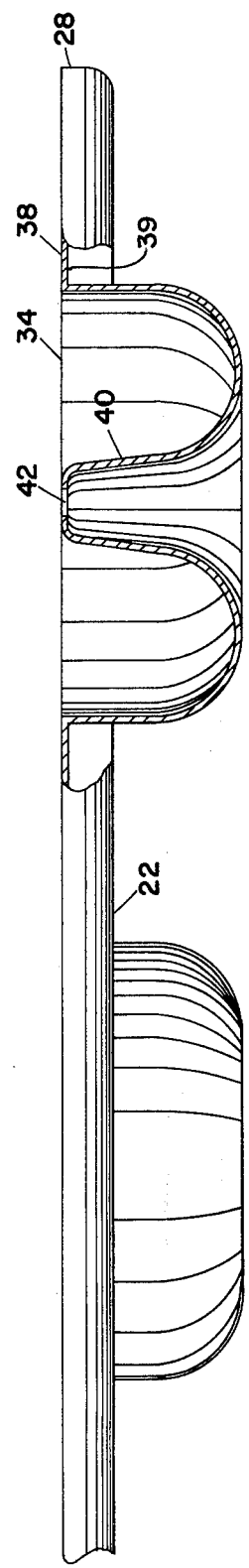
FIG. 3 is a partial side elevational view, partially in section taken through the centerline of a recess of the middle pan as shown in FIG. 1.
Figure 4:
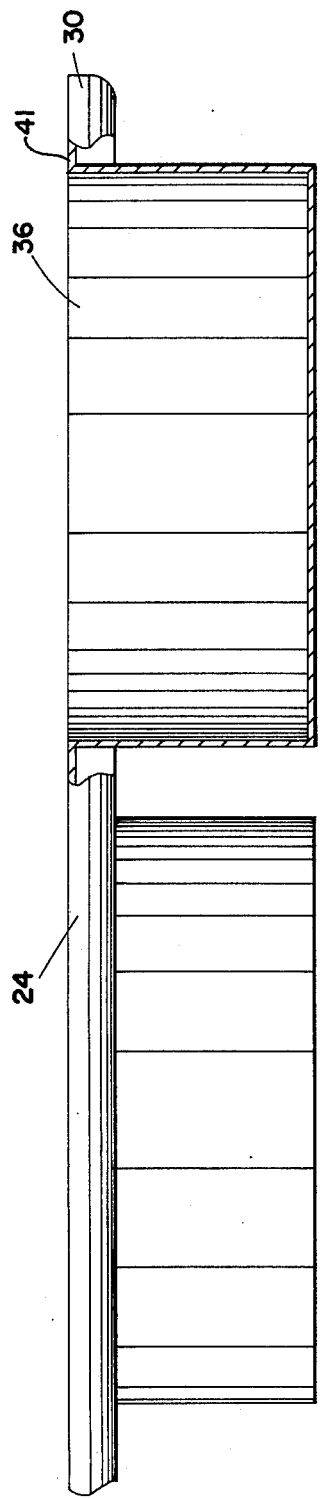
FIG. 4 is a partial side elevational view, partially in section taken through the centerline of a recess of the bottom pan as shown in FIG. 1.
Figure 5:
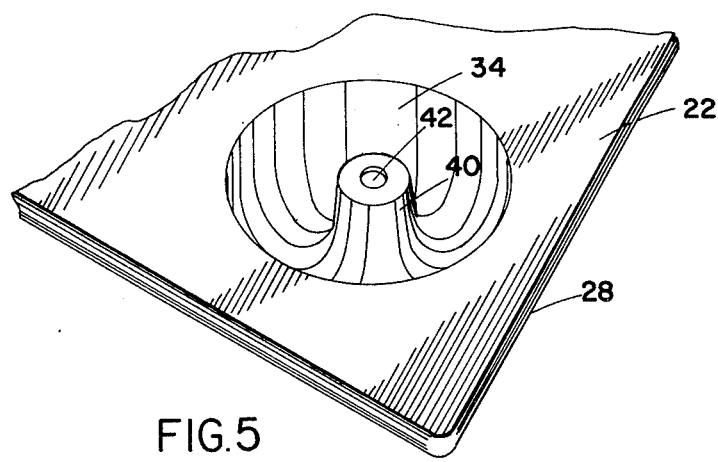
FIG. 5 is a perspective view of a portion of the middle pan shown in FIG. 3, illustrating the inner configuration of the recess provided in the middle pan.
Figure 6:
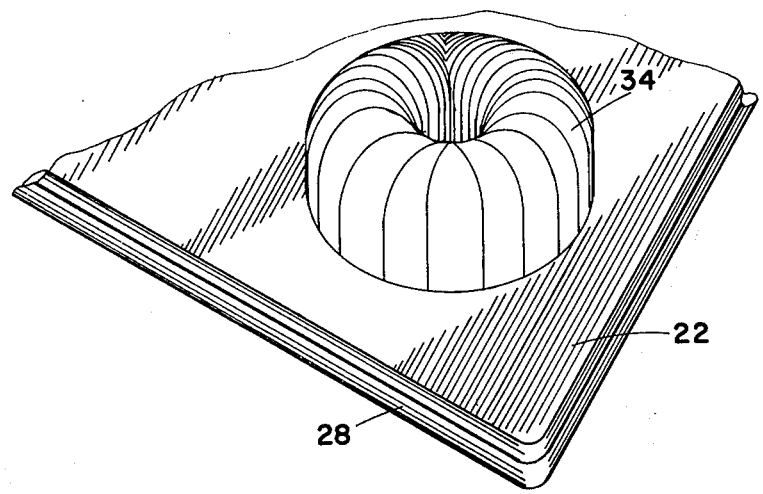
FIG. 6 is a perspective view of that portion of the pan assembly shown in FIG. 5 illustrating the configuration of the bottom downwardly extending surface of the recess formed in the middle pan.

A baking pan assembly constructed in accordance with the present invention is illustrated in FIG. 1 and includes upper, middle and lower baking pans 20, 22 and 24 respectively. Each of said pans include curled outer lip portions 26, 28 and 30 respectively. The outer dimensions of the perimeter of each pan 20–24 are slightly smaller in a decending order from the top to the bottom pan such that the lip portion 28 of the middle pan 22 fits within the lip portion 26 of the upper pan 20. Accordingly lip portion 30 of bottom pan 24 fits within lip portion 28 of middle pan 22 such that when the pans are placed together atop one another a substantially sealed relationship exists between the pans.

Each of the baking pans 20-24 include a plurality of recesses 32, 34 and 36 of predetermined shape and dimensions and substantially disposed in rows in vertical alignment with the recesses of the vertical adjacent pan.

Recesses 32 in upper pan 20 and recesses 36 in lower pan 24 are generally of conventional shape with recesses 36 having a significantly greater depth than recesses 32. The depth of recess 36 is greater as it represents the lower half of the sandwich bun and accomodates the bowl-like protrusion of recess 34 in middle pan 22 when the pans are assembled and ready to place in the oven.

Recess 32 is wider than recess 34 such that the bottom surface 37 of recess 32 fits flush on the top surface 38 of middle pan 22.

Recess 34 has a unique, bowl-like configuration with a central post 40 which is provided with a vapor outlet hole 42 which permits vapor created during the baking process to exit from recess 36.

Figure 8:
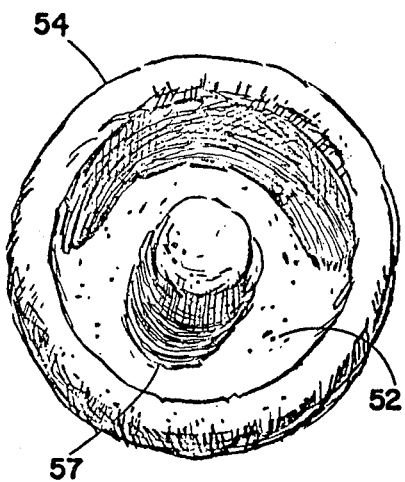
FIG. 8 is a top plan view of the bottom portion of the bun shown in FIG. 7.
Figure 7:
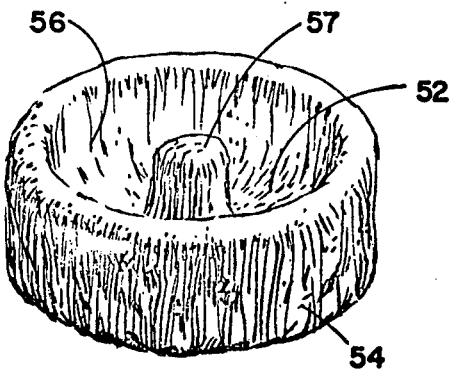
FIG. 7 is a perspective view of the bottom portion of the novel sandwich bun which is made utilizing the pan assembly of the present invention.
Figure 9:
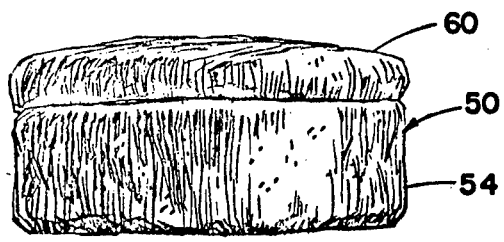
FIG. 9 is a side elevational view of the whole bun made employing the present invention.
Figure 11:
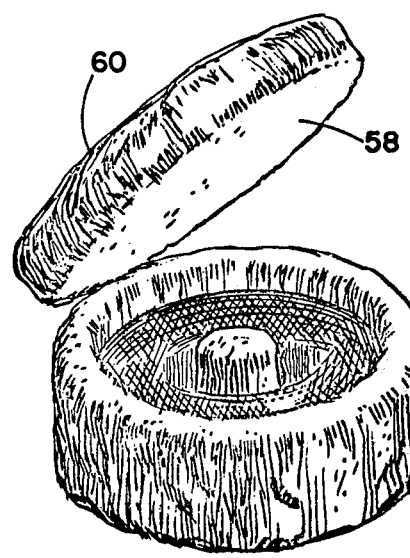
FIG. 11 is a perspective view of the whole bun shown in FIG. 9 illustrating the top portion in a partially open position and a meat product disposed in the lower portion.
Figure 10:
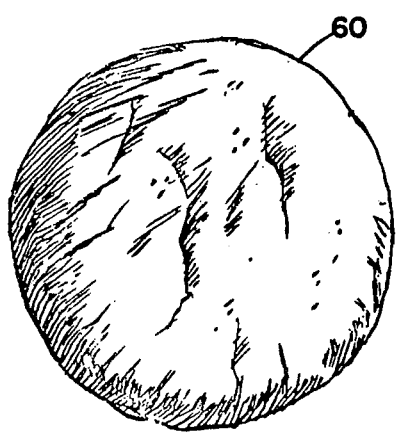
FIG. 10 is a top plan view of a portion of the bun shown in FIG. 9 illustrating the top surface of the upper portion of the bun.

The unique assembly and construction of the baking pans of the present invention permits the user to create a novel sandwich bun indicated generally at 50 in FIG. 8, which includes not only the unique recess 52 provided in the lower portion 54 but more importantly, the outer surfaces 56 of the recess in this lower portion maintains the soft, unbrowned texture similar to the inner portion of a conventional bun. Similarly, the central protrusion 57 is of the same texture as the other surfaces of the recess.

Further, employing the method and the assembly of baking pans of the instant invention provides the lower surface 58 of the upper portion 60 of the bun with the same soft, unbronwed texture.

In other words, quite unexpectedly, the specific arrangement and construction of the baking pans of the present invention, permits the making of a bun with a unique configuration in a one step baking process which heretofore was not possible employing conventional apparatus and techniques.

In conventional bun or in the baking of bread, the soft, unbrowned texture of the product was confined to inner portions not directly in contact with either the baking pan or the radiated heat of the oven.

In the arrangement of pans of the present invention, the unbrowned portions are in contact with the surfaces of the baking pans, but nevertheless do not become browned during the baking step.

In practicing the present invention, one places in the usual manner a given quantity of conventional bread dough or the like in recesses 32 and another given quantity in recesses 36. Then middle pan 22 is assembled over bottom pan 24 with recesses 34 extending downwardly into the dough in recesses 36. Sufficient downward pressure is applied to pan 28 to fully seat the bottom surface 39 of middle pan 22 substantially flush against the top surface 41 of bottom pan 24 with lip 28 overlapping lip 30.

Next, upper pan 20 is positioned in the same manner over middle pan 22 with lip 26 overlapping lip 28.

The assembled pans are than placed in a conventional oven and baking proceeds in a conventional manner.

Upon the completion of the baking step, the assembled pans are removed from the oven and top pan 20 is removed from the assembly. The baked dough in each recess 32 is removed and forms the top portion 60 of the bun 50. The lower surface 58 of this portion possesses a soft, unbrowned texture similar to the texture of a conventional bun when cut in half.

The middle pan 22 is then removed to expose the baked dough in recesses 36 which represent the lower portion 54 of the bun 50. When removed from recess 36, each such portion has an outer surface of conventional browned texture and a depression of cavity 52 which has the form of recess 34 including the central post or protrusion 57. Further, the entire surface of the cavity in the lower portion 54 of bun 52 possesses the soft, unbronwed texture substantially the same as the lower surface 58 of the upper portion 60.

What is claimed is:

1. A method of baking a sandwich bun having a separate upper and lower portion between which a food product is to be disposed comprising the steps of placing a given quantity of dough in the recesses of a first baking pan and the recesses of a second baking pan; placing a third baking pan provided with a plurality of downwardly extending protrusions over said first baking pan with a respective one of said protrusions extending into a respective one of said recesses containing the dough in said first pan to form and maintain a recess in said dough corresponding to the shape of said protrusions; placing said second baking pan on top of said third baking pan with the dough-filled recess of said second pan substantially aligned with said recesses in said first pan; and wherein a substantially sealed relationship is provided upon assembly between said first and third pans and between said second and third pans and baking the dough in the arranged assembly of baking pans.

2. A method according to claim 1 wherein sufficient downward pressure is exerted and maintained on said third pan upon assembly of said pan to seat the bottom surface of said third pan substantially flush with the top surface of said first pan.

* * * * *